Patented Dec. 8, 1925.

1,564,631

UNITED STATES PATENT OFFICE.

KARL FRIEDRICH SCHMIDT, OF HEIDELBERG, GERMANY.

PROCESS OF MAKING DERIVATIVES OF HYPOTHETICAL IMINES INCLUDING AMINES AND THEIR SUBSTITUTION PRODUCTS.

No Drawing.      Application filed May 8, 1925. Serial No. 28,962.

*To all whom it may concern:*

Be it known that I, KARL FRIEDRICH SCHMIDT, a citizen of the German Republic, and a resident of Heidelberg, Germany, have invented new and useful Improvements in the Processes of Making Derivatives of Hypothetical Imines Including Amines and Their Substitution Products, of which the following is a specification.

Methods for the direct introduction of amido groups into hydrocarbons have not been known heretofore. The way usually leads through the nitro compounds, in some cases also through phenols, whereby the characteristic groups of the compounds are modified and/or exchanged.

It has now been found possible, by the action of hydrazoic acid, which is caused to decompose under the influence of concentrated mineral acids, to introduce amido groups directly into numerous hydrocarbons and their derivatives. The hydrazoic acid is thus decomposed into $N_2$ and the residue NH, which attaches itself for example, to benzol with the formation of aniline.

If the action of the decomposing hydrazoic acid occurs upon organic compounds with double bonds (C=C, N=N, C=O), for example aldehydes, ketones, unsaturated acids, ketone acids, the attaching of NH to the double bond occurs. With aldehydes, for example, nitrils or the formyl compounds of the respective amines are formed in this way. In this the intermediate formation of the residue

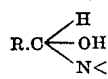

is to be assumed, which either splits off water and gives the nitril,

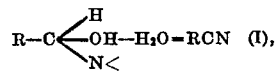

or suffers a sort of Curtius or Beckmann exchange.

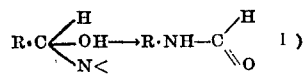

The reaction can be conducted as desired in either direction by the quantity of the acid used.

Since the formyl compounds of the corresponding amines forming from aldehydes according to Equation II may be easily split into formic acid and amine, the reaction described provides a new way for replacing the aldehyde group by the amido group.

Analogously, substituted acid amides are formed from ketones, where the course of reaction according to Equation I is naturally excluded, for example,

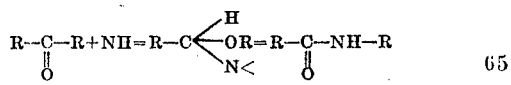

a procedure which usually gives the end product in quantitative yield.

The action of hydrazoic acid upon unsaturated compounds is indeed already known (see, for example, Chemisches Centralblatt, 1913, pages 2024 and 1915, II, page 596). In these reactions however the hydrazoic acid is attached as a whole. There are thus formed by the addition of $N_3H$ to unsaturated compounds, azides or their conversion products. These reactions are therefore characterized in that the resulting reaction products contain three more nitrogen atoms than the initial material. In the process of this application, however, not hydrazoic acid, but the NH residue is attached, while a molecule of $N_2$ evolves as gas.

In order that my invention may be clearly understood the following examples are given:

*Example 1.*

7 grams of hydrazoic acid dissolved in 500 c. c. of benzol, are stirred energetically with a little concentrated sulfuric acid, sirupy phosphoric acid, or the like, at 60°, until the evolution of gas has ceased. A yield of 5 grams of aniline is obtained. The reaction may be expressed by the following:

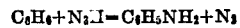

*Example 2.*

An about normal solution of $N_3H$ in p-xylol has added thereto by drops 5% of its weight of concentrated sulfuric acid, and the temperature thereby kept at about 60°. When all the sulfuric acid has been poured in, with energetic stirring (turbinieren), the evolution of gas comes to a standstill after about 6 hours in all. The acid layer contains the p-xylidin formed. The yield amounts to 5 grams from 10 grams of $N_3H$. The reaction may be expressed as follows:

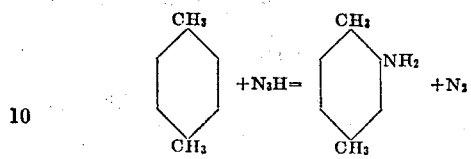

*Example 3.*

To 4.5 grams of $N_3H$, in 130 c. c. of ether and 4.4 grams of acetaldehyde, there is added 7 c. c. of concentrated $H_2SO_4$. The mixture of aldehyde and hydrazoic acid in ether is kept in an ice-cooled reaction flask; the sulfuric acid is slowly dropped in with stirring. In this way 2.8 grams of $N_3$ are evolved. The other layer contains the acetonitril (b. p. 79°), and the yield amounts to 64%. The reaction may be expressed as follows:

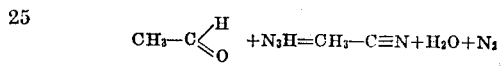

In the sulfuric acid layer methyl formamid is found which, after saponification is transformed into methylamine and formic acid. The yield is around 20%. The reaction may be expressed as follows:

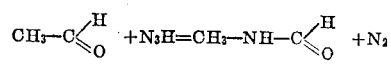

*Example 4.*

10.6 grams of benzaldehyde and 4.8 grams of $N_3H$ in 150 c. c. of benzol have added, drop by drop, and with cooling, 4 c. c. of concentrated sulfuric acid. The benzonitril formed passes over between 189 and 193°. The reaction may be expressed as follows:

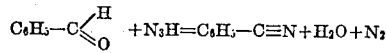

It gives ammonia and benzoic acid by alkaline saponification. The yield is 70%. As a by-product there is obtained formanilid, b. p. 278–282°. The yield is 13%. The reaction may be expressed as follows:

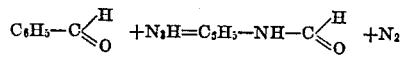

*Example 4ᵇ.*

The same quantities as above, but 30 c. c. of concentrated $H_2SO_4$. The yield of benzonitril is 5%, and formanilid 50%.

*Example 5.*

Employing the conditions and observing the precautions previously outlined, and using quantities of $\frac{1}{10}$ molecule each, acetone is treated with $N_3H$ and a great excess of acid is used. The yield of methyl acetamide is quantitative. The reaction may be expressed as follows:

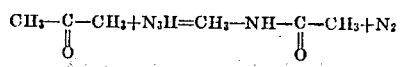

*Example 6.*

In a benzol solution of 0.43 grams of $N_3H$ are placed 1.82 grams of benzophenon, and then with cooling are added a few drops of concentrated $H_2SO_4$. A violent evolution of gas results. The reaction product is in the sulfuric acid layer, and precipitates with dilution of the same. After recrystallization from alcohol, the body melts at 180° and is identical with benzanilid. The yield is quantitative. The reaction may be expressed as follows:

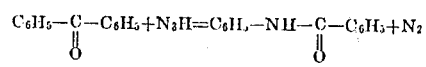

*Example 7.*

A solution of 9.8 grams of cyclohexanon and 8.6 grams of hydrazoic acid in about 250 c. c. of benzol is slowly dropped with stirring and ice cooling into 20 c. c. of concentrated sulfuric acid, which has a layer of about 100 c. c. of benzol over it. After the end of the dropping, the gas evolution soon comes to a standstill, and the measured quantity (0.1 mol) of cyclohexanon used. The benzol contains no reaction product. The acid layer is diluted with ice and cautiously neutralized with strong caustic solution, whereby the reaction product is separated as an oily layer. It is taken up with chloroform, and after the latter is distilled off remains behind as a sirup easily soluble in all solvents. After dilution with water, for removing the alpha-beta-cyclopentamethylene tetrazol formed as a by-product, it is precipitated with saturated sublimate solution; the filtrate after treatment with hydrogen sulfide is evaporated, and the residue either purified by distillation or by recrystallization from ether.

There is obtained a yield 7.5 grams of pure ε leucin-lactam of m. p. 65°. The reaction may be expressed as follows:

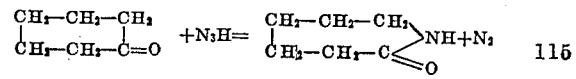

In place of the benzolic hydrazoic acid, here as elsewhere, the ether solution may also be used.

In the claims the expression "organic compounds of the hydrocarbon type" is intended as a generic expression to include hydrocarbons, and their derivatives.

The term, "amines" includes the primary amines, the secondary amines and the tertiary amines. (See "A Text-Book of Organic Chemistry," Richter, translated by Smith, volume 1, pages 166 and 167, B.

Blakiston's Son & Company, 1913.) From the above it is clear that the present invention resides in the direct introduction of either the $NH_2$ group, the NH group or amine nitrogen corresponding to that present in the tertiary amine or their derivatives into hydrocarbons or their derivatives. In the claims, the expression "amine nitrogen" is intended to include the direct introduction of nitrogen in the form above referred to. It is a generic expression for amine nitrogen in the imines, the amines and their substitution products and the nitrils.

I claim:

1. The process of making derivatives of hypothetical imines including amines and their substitution products, characterized in that organic compounds of the hydrocarbon type are treated with hydrazoic acid in the presence of concentrated mineral acids.

2. The process of treating organic compounds of the hydrocarbon type to directly introduce therein amine nitrogen comprising adding thereto hydrazoic acid in the presence of another acid.

3. The process of treating organic compounds of the hydrocarbon type to directly introduce therein amine nitrogen comprising adding thereto hydrazoic acid in the presence of a concentrated mineral acid.

4. The process of treating organic compounds of the hydrocarbon type to directly introduce therein amine nitrogen comprising adding thereto hydrazoic acid in the presence of a concentrated mineral acid, the mixture being kept cooled during the reaction period.

5. The process of treating organic compounds of the hydrocarbon type to directly introduce therein an amido group comprising adding thereto hydrazoic acid in the presence of a concentrated mineral acid.

In testimony that I claim the foregoing as my invention, I have signed my name hereto.

KARL FRIEDRICH SCHMIDT.